(12) United States Patent
Egolf et al.

(10) Patent No.: US 8,739,683 B2
(45) Date of Patent: *Jun. 3, 2014

(54) GAS SPRING PISTON WITH PARTIAL BELLOWS SUPPORT FEATURE AND GAS SPRING ASSEMBLY INCLUDING SAME

(75) Inventors: Stephen R. Egolf, Indianapolis, IN (US); Andrew Grabarz, Cicero, IN (US); Stephen C. Street, Carmel, IN (US); Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,534

(22) Filed: May 8, 2012

(65) Prior Publication Data

US 2012/0217688 A1    Aug. 30, 2012

Related U.S. Application Data

(63) Continuation of application No. 12/166,868, filed on Jul. 2, 2008, now Pat. No. 8,191,458.

(51) Int. Cl.
*F01B 9/04* (2006.01)
*F16F 9/05* (2006.01)

(52) U.S. Cl.
USPC ............... 92/98 D; 267/64.21; 267/64.24

(58) Field of Classification Search
USPC ............. 92/98 D; 267/64.21, 64.24, 64.27
See application file for complete search history.

(56) References Cited

U.S. PATENT DOCUMENTS

| | | | |
|---|---|---|---|
| 3,033,558 A | 5/1962 | Slemmons et al. | |
| 3,257,107 A | 6/1966 | Nishioka et al. | |
| 4,386,791 A | 6/1983 | Watanabe | |
| 4,506,910 A | 3/1985 | Bierens | |
| 6,234,460 B1 | 5/2001 | Arnold | |
| 6,386,524 B1 | 5/2002 | Levy | |
| 6,685,173 B2 | 2/2004 | Oldenettel et al. | |
| 6,945,548 B2 | 9/2005 | Dudding | |
| 8,191,458 B2 * | 6/2012 | Egolf | 92/98 D |
| 2006/0049600 A1 | 3/2006 | Dudding et al. | |
| 2006/0220283 A1 | 10/2006 | Leonard | |
| 2006/0226586 A1 | 10/2006 | Levy | |
| 2007/0114706 A1 | 5/2007 | Myers | |

FOREIGN PATENT DOCUMENTS

| | | |
|---|---|---|
| DE | 101 49 057 | 4/2003 |
| DE | 102 42 436 | 4/2004 |
| DE | 20 2005 00793 | 9/2006 |
| EP | 0 296 445 | 12/1988 |
| EP | 0 647 795 | 4/1995 |
| EP | 1 657 467 | 5/2006 |
| EP | 2 093 082 | 8/2009 |
| FR | 2 827 550 | 1/2003 |
| WO | WO 00/70238 | 11/2000 |

* cited by examiner

*Primary Examiner* — F. Daniel Lopez

(74) *Attorney, Agent, or Firm* — Jason A. Houser; Fay Sharpe LLP

(57) ABSTRACT

A piston for use in forming a gas spring assembly includes a longitudinally extending axis, a first end wall extending approximately transverse to the axis, and an outer side wall extending longitudinally from adjacent the first end wall. The outer side wall includes a first side wall portion that forms a fully circumferential outer surface and a second side wall portion that forms a partially circumferential outer surface that extends longitudinally beyond the fully circumferential outer surface. A gas spring assembly including such a piston is also included.

20 Claims, 12 Drawing Sheets

GAS SPRING PISTON WITH PARTIAL BELLOWS SUPPORT FEATURE AND GAS SPRING ASSEMBLY INCLUDING SAME

This application is a continuation of U.S. patent application Ser. No. 12/166,868, filed on Jul. 2, 2008, now U.S. Pat. No. 8,191,458, which is hereby incorporated herein by reference in its entirety.

BACKGROUND

The subject matter of the present disclosure broadly relates to the art of gas spring devices and, more particularly, to a gas spring piston that includes one or more partial bellows support areas for supporting a portion of a flexible wall and a gas spring assembly including the same.

The subject matter of the present disclosure finds particular application and use in conjunction with suspension systems of wheeled vehicles, and will be shown and described herein with particular reference thereto. However, it is to be appreciated that the present exemplary embodiments are also amenable to use in other applications and environments. For example, the subject matter of the present disclosure could be used in operative association with structural supports, height adjusting systems and/or actuators associated with industrial machinery, components thereof and/or other such equipment on which lateral load conditions may be encountered. Accordingly, the subject matter of the present disclosure is not intended to be limited to use associated with vehicle suspensions and it is to be understood that the embodiments shown and described herein are merely exemplary.

Gas spring assemblies of various kinds and constructions are well known and commonly used in vehicle suspension systems, industrial machinery as well as other equipment and devices to provide dynamic load support between sprung and unsprung masses associated therewith. A typical gas spring assembly includes two opposing end members with a flexible wall or sleeve secured between the two end members that at least partially define a spring chamber. A quantity of pressurized gas, usually air, is contained within the spring chamber and acts on the spaced end members as well as opposing portions of the flexible wall to support the load of the sprung mass or a force that is otherwise applied to the gas spring assembly.

It is commonly understood that gas spring assemblies are well suited for supporting loads acting axially (i.e., longitudinally between the opposed end members thereof), but that only a minimal lateral load, if any, can be supported by a typical gas spring assembly. Thus, applications that are normally identified as being well suited for the use of gas spring assemblies primarily involve the transfer of axially applied loads. As a result, there is a considerable body of art that is directed to arrangements for securing the gas spring assembly to a corresponding structural member in a way that provides sufficient axial support. Such arrangements commonly include the use of threaded fasteners, fixed mounting studs with threaded nuts and/or snap together-type connections.

It has been recognized, however, that in some applications the action of the gas spring assembly itself can generate lateral load conditions on one or more of the end members thereof. For example, in an application in which one end member is disposed at and/or moved through an angle relative to the other end member, the flexible wall is urged outwardly toward the open end of the included angle between the end members. This action can generate a lateral load acting on one or both of the end members. Unfortunately, many known securement arrangements, having been designed to withstand axially-applied loads, as discussed above, are less well suited for use under lateral or shear loads. Therefore, a need exists for an improved arrangement for engaging an end member of a gas spring assembly with a corresponding structural member such that the interface can withstand the aforementioned lateral load conditions, such as may be encountered by a vehicle suspension system, for example.

Various arrangements have been proposed to overcome the above-described difficulties. One example of such an arrangement is shown in U.S. Pat. No. 5,342,139, which discloses an attachment device for mounting an end member of an air spring assembly on a corresponding support component. Another example of such an arrangement is shown in U.S. Pat. No. 6,752,407, which discloses a multi-component and mounting plate arrangement for securing an air spring along a structural component. Still another example of such an arrangement is shown in U.S. Pat. No. 6,945,548, which discloses a spacer that is adapted to engage the air spring assembly and includes a winged portion that engages a slot in the corresponding structural component. Yet another example of such an arrangement is shown in U.S. Patent Application Publication No. 2006/0055094, which discloses an air spring with end members having snap-in attachments for engaging the corresponding structural members.

While the above-described arrangements have met with some degree of success, numerous difficulties and/or disadvantages have been identified with the same, which have undesirably impacted the widespread adoption and use of the same. Such difficulties and/or disadvantages include the use of additional components, such as extra fasteners, retention pins, mounting brackets and/or other components, which undesirably increase inventory and production costs and can also raise installation and maintenance issues. What's more, certain design configurations, such as snap-in type designs, for example, may be insufficiently robust to withstand both the axial and lateral load conditions, particularly those associated with heavy-duty applications. Furthermore, some known arrangements utilize features that extend radially-outwardly beyond the periphery of at least a portion of the gas spring assembly, which can result in space constraints for other components.

Additionally, attachment and/or other features of suspension components of vehicles are often disposed within approximately the same area in which a gas spring assembly of a suspension system also resides. As such, accommodations are often provided on one or more components of gas spring assemblies to help avoid interference with the attachment and/or other features while permitting the component of the gas spring assembly to be mounted or otherwise secured to a suspension component in that same area.

Such accommodations are commonly used in association with gas spring assemblies of the rolling lobe-type, which typically include a piston that has an outer side wall and flexible sleeve that is secured along the piston such that a lobe formed thereby can roll along the outer side wall as the gas spring assembly undergoes displacement. As one example of such an accommodation, the outer side wall of the piston can be supported or otherwise disposed in vertically spaced relation to the associated structural component along which the piston is secured. This accommodation can be accomplished in any suitable manner. For example, the piston of the gas spring assembly can include a bottom or end wall that the abuttingly engages the associated structural component with the nearest end of the outer side wall being disposed in spaced relation to the bottom wall. As another example, a spacer or other suitable component can be positioned and secured between the piston of the gas spring assembly and the associated structural component to space the end of the outer side wall a distance from the associated structural component.

In any case, such an accommodation often results in a gap or space being formed between the end of the outer side wall of the piston and the associated structural component to which the gas spring assembly is mounted. Under certain circumstances and conditions of operation of the gas spring assembly, the lobe of the flexible sleeve can begin to roll off of the edge of the outer side wall and into the aforementioned gap or space. Such situations are generally undesirable, as the same can result in decreased performance (e.g., a reduction in spring rate) of the gas spring assembly. Additionally, it has been recognized that as the gap or space increases in size, even greater decreases in performance can occur.

Therefore, it is believed desirable to develop a piston and gas spring assembly using the same that overcomes the foregoing and other issues and disadvantages.

BRIEF DESCRIPTION

A piston in accordance with the subject matter of the present disclosure is provided for use in forming an associated gas spring assembly and that is adapted to engage an associated projection of an associated structural support member is provided that includes a first end, which includes a first end wall adapted to engage an associated flexible sleeve of the associated gas spring assembly. An opposing second end includes a second end wall adapted to abuttingly engage the associated structural support member. The second end is disposed in longitudinally-spaced relation to the first end such that a central axis extends therebetween. An outer side wall extends at least partially between the first and second ends and is suitable for rolling of the associated flexible sleeve therealong. An inner side wall is disposed in radially-inwardly spaced relation to the outer side wall such that a chamber is at least partially defined therebetween. First and second support walls extend from the inner side wall to the outer side wall such that the chamber is at least partially segmented by the first and second support walls. First and second recess walls are positioned between the inner and outer side walls. The first and second recess walls extend between the first and second support walls and are radially spaced from one another to at least partially define a recess that is adapted to receive the associated projection of the associated structural support member such that lateral loads acting on the piston can be transferred to the associated projection.

A gas spring assembly in accordance with the subject matter of the present disclosure is provided that is adapted for use on an associated structural component having an associated projection for opposing laterally-acting loads and includes a first end member. A second end member is spaced from the first end member and is adapted for use in operative association along the associated structural component. A flexible wall is secured between the first and second end members and at least partially defines a spring chamber therebetween. The second end member includes a first end wall and a second end wall disposed in spaced relation to one another such that a central axis is formed therebetween. An axially-extending outer wall includes an outer wall surface for rolling of the flexible wall therealong. An axially-extending inner wall is positioned radially-inwardly from the outer wall such that a cavity is formed therebetween. Two or more radially-extending support walls are connected between the inner and outer walls. A recess wall extends between adjacent ones of the two or more support walls and at least partially defines a recess therebetween that is operative to receive the associated projection and thereby transfer lateral loads acting on the second end member to the associated structural component along which the associated projection is provided.

A spacer in accordance with the subject matter of the present disclosure is provided that is adapted to support an associated end member of an associated gas spring assembly in spaced relation to an associated structural component having an associated projection. The spacer includes a first side adapted to abuttingly interengage the associated end member such that lateral loads acting on the associated end member can be transferred to the spacer. An opposing second side is adapted to abuttingly engage the associated structural component. A recess is accessible from along the second side and is adapted to cooperatively receive the associated projection for transferring laterally-acting loads from the associated end member to the associated structural component.

A gas spring and spacer assembly in accordance with the subject matter of the present disclosure is provided for securement along an associated structural component having an associated projection extending therefrom. The gas spring and spacer assembly includes a first end member and a second end member disposed in longitudinally-spaced relation to the first end member. The second end member includes a first surface facing away from the first end member. A flexible wall is secured between the first and second end members and at least partially defines a spring chamber therebetween. A spacer includes opposing first and second sides and a recess accessible from along the second side. The first side includes a first surface adapted to abuttingly engage the first surface of the second end member. The second side includes a second surface adapted to abuttingly engage the associated structural component. The recess is operative to receive the associated projection and thereby transfer lateral loads acting on the second end member to the associated structural component along which the associated projection is provided.

Another gas spring assembly in accordance with the subject matter of the present disclosure is provided that includes a flexible sleeve, a first end member and a piston. The flexible sleeve includes a sleeve wall extending between longitudinally-spaced sleeve ends and has a longitudinal axis extending therebetween. The sleeve wall extends circumferentially about the axis to at least partially define a spring chamber. The end member is secured along one of the ends of the flexible sleeve such that a substantially fluid-tight seal is formed with the sleeve wall. The piston is secured on the other of the ends of the flexible sleeve such that a substantially fluid-tight seal is formed with the sleeve wall. The piston includes a first end wall abuttingly engaging the sleeve wall and an outer side wall extending longitudinally from along the first end wall. The outer side wall is suitable for rolling a lobe of the sleeve wall therealong. The outer side wall includes a first side wall portion at least partially defining a fully circumferential support area for abuttingly engaging the flexible sleeve. The outer side wall also includes a second side wall portion extending longitudinally from the first side wall portion in a direction away from the first end wall. The second side wall portion defines a partially circumferential support area for abuttingly engaging a corresponding circumferential portion of the flexible sleeve upon longitudinal displacement of the lobe of the sleeve wall beyond the fully circumferential support area.

Additionally, a gas spring assembly according to the foregoing paragraph can be provided wherein the piston includes an inner side wall disposed in radially-inwardly spaced relation to the outer side wall such that an outer chamber is at least partially defined therebetween.

Furthermore, a gas spring assembly according to the foregoing paragraph can be provided wherein the piston includes a plurality of support walls extending from the inner side wall to the outer side wall. The plurality of support wall interconnect the inner and outer side walls. And, the plurality of support walls are disposed in spaced relation to one another.

Further still, a gas spring assembly according to the foregoing paragraph can be provided wherein the piston includes a recess wall extending between adjacent ones of the plurality of support walls and at least partially defining a recess therebetween. The recess being adapted to receive an associated projection of an associated structural component to thereby transfer lateral loads acting on the piston to the associated structural component.

Also, a gas spring assembly according to the foregoing paragraph can be provide wherein the piston includes at least two recesses disposed on circumferentially opposing sides thereof.

Additionally, a gas spring assembly according to either of the foregoing two paragraphs can be provided wherein the recess wall of the piston is a first recess wall, and the piston further includes a second recess wall disposed in radially-spaced relation to the first recess wall such that the recess is at least partially formed therebetween.

Furthermore, a gas spring assembly according to the foregoing paragraph can be provided wherein the piston includes at least one support rib extending between the first and second recess walls. The at least one support rib being operative to minimize lateral displacement of the first and second recess walls relative to one another under laterally-applied loads.

Another piston in accordance with the subject matter of the present disclosure is provided for use in forming an associated gas spring assembly that includes an associated flexible sleeve. The piston includes a first end and an opposing second end. The first end includes a first end wall adapted to abuttingly engage the associated flexible sleeve of the associated gas spring assembly. The second end includes a second end wall that is adapted to abuttingly engage an associated structural component. Additionally, the second end is disposed in longitudinally-spaced relation to the first end such that a central axis extends therebetween. The piston also includes an outer side wall that extends longitudinally along the piston and is suitable for rolling of the associated flexible sleeve therealong. The outer side wall includes a first side wall portion and at least one second side wall portion. The first side wall portion has a distal extent disposed at a first longitudinal distance from the first end wall. The at least one second side wall portion has a distal extent disposed at a second longitudinal distance from the first end wall. The second longitudinal distance is greater than the first longitudinal distance such that the at least one second side wall portion extends longitudinally beyond the distal extent of the first side wall portion.

Additionally, a piston according to the foregoing paragraph can be provided that further comprises an inner side wall extending longitudinally along the piston. The inner side wall is disposed in radially-inwardly spaced relation to the outer side wall such that an outer chamber is at least partially defined therebetween.

Furthermore, a piston according to the foregoing paragraph can be provided that further comprises a plurality of support walls extending between the inner and outer side walls to thereby interconnect the inner and outer support walls to one another. The plurality of support walls are disposed in spaced relation to one another such the outer chamber is at least partially separated into a plurality of chamber portions.

Further still, a piston according to the foregoing paragraph can be provided that further includes first and second recess walls positioned between the inner and outer side walls. The first and second recess walls extend between adjacent ones of the plurality of support walls. The first and second recess walls are also radially spaced from one another to at least partially define a recess adapted to receive an associated projection of an associated structural support member such that lateral loads acting on the piston can be transferred to the associated projection.

Also, a piston according to the foregoing paragraph can be provided wherein the outer chamber has an open end formed toward the second end of the piston. And, the recess is at least partially disposed within the outer chamber and accessible from along the open end.

Additionally, a piston according to either of the foregoing two paragraphs can be provided that further comprises one or more support ribs connecting the inner side wall and the first recess wall.

Furthermore, a piston according to any of the foregoing three paragraphs can be provided that further comprises one or more support ribs connecting the first and second recess walls.

Further still, a piston according to any of the foregoing four paragraphs can be provided that further comprise one or more support ribs connecting the second recess wall and the outer side wall.

Also, a piston according to any one of the foregoing five paragraphs can be provided wherein the inner and outer side walls have a first nominal thickness and at least one of the first and second recess walls has a second nominal thickness that is at least 50 percent greater than the first nominal thickness of the inner and outer side walls.

Additionally, a piston according to the foregoing paragraph can be provided wherein the first nominal thickness is within a range of from about 0.10 inches to about 0.15 inches, and the second nominal thickness is within a range of from about 0.15 inches to about 0.35 inches.

DETAILED DESCRIPTION

Figure 1:
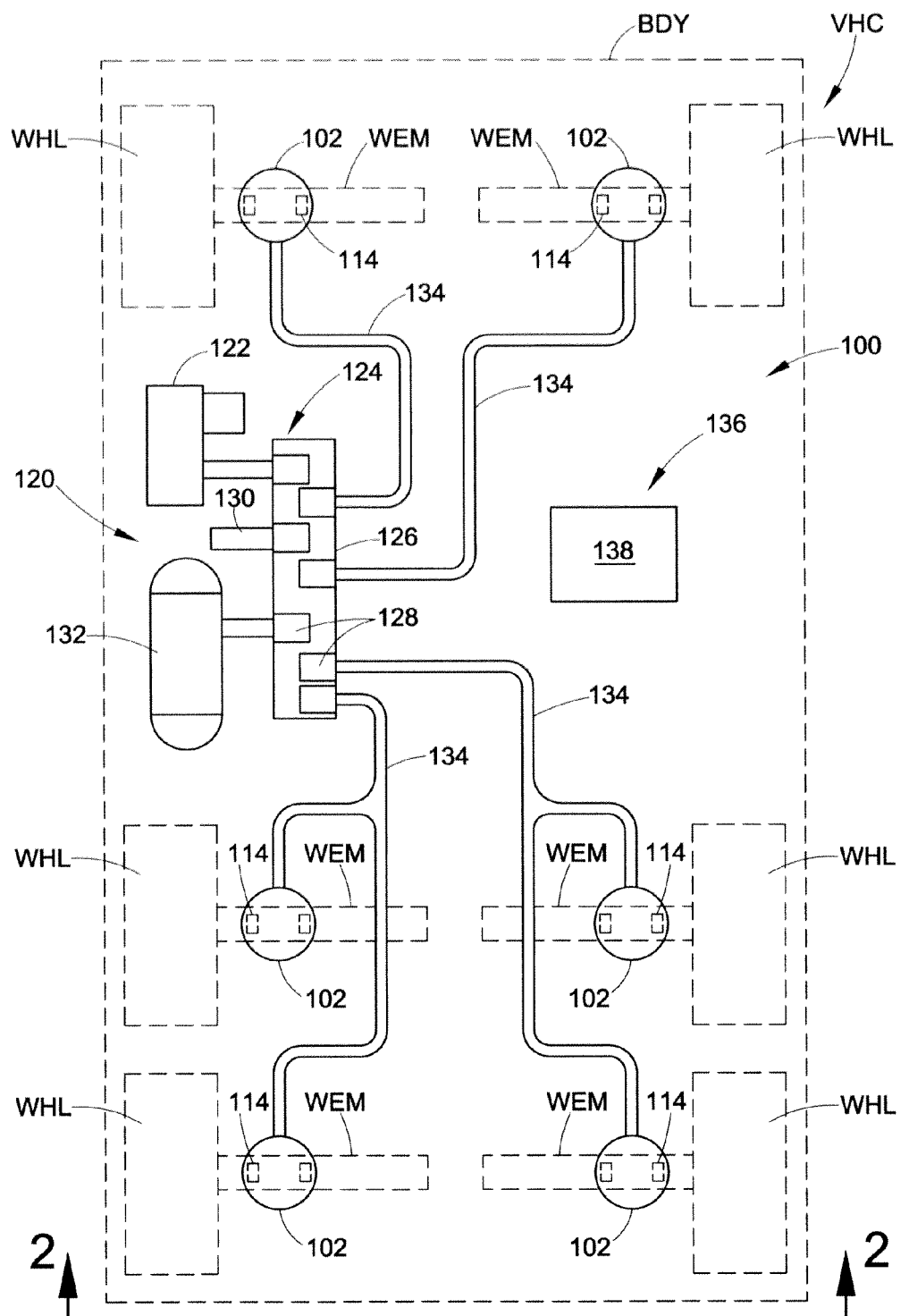
FIG. 1 is a schematic representation of a vehicle that includes gas spring assemblies operatively connected to vehicle structures using cooperative mounting arrangements in accordance with the subject matter of the present disclosure.

Turning now to the drawings, wherein the showings are for the purpose of illustrating examples of the subject matter of the present disclosure and which are not intended as a limitation of the same. FIG. 1 illustrates one embodiment of a suspension system 100 disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies 102, one or more of which is disposed toward each corner of the associated vehicle adjacent a corresponding wheel WHL thereof. However, it will be appreciated that any other suitable number of gas spring assemblies 102 could alternately be used and that such gas spring assemblies can be disposed in any other suitable configuration or arrangement.

As will be shown and discussed in greater detail hereinafter, gas spring assemblies 102 include a first or upper end member, such as a bead plate 104, for example, a second or lower end member, such as piston 106, for example, and a flexible wall, such as an elongated sleeve 108, for example, that is secured therebetween in a substantially fluid-tight manner. Thus, it will be recognized that the gas spring assemblies shown and described herein (e.g., gas spring assemblies 102) are of a rolling lobe-type construction. However, it is to be understood that the subject matter of the present disclosure can be utilized in association with gas spring assemblies of any other type, kind, arrangement, configuration and/or construction.

Figure 2:
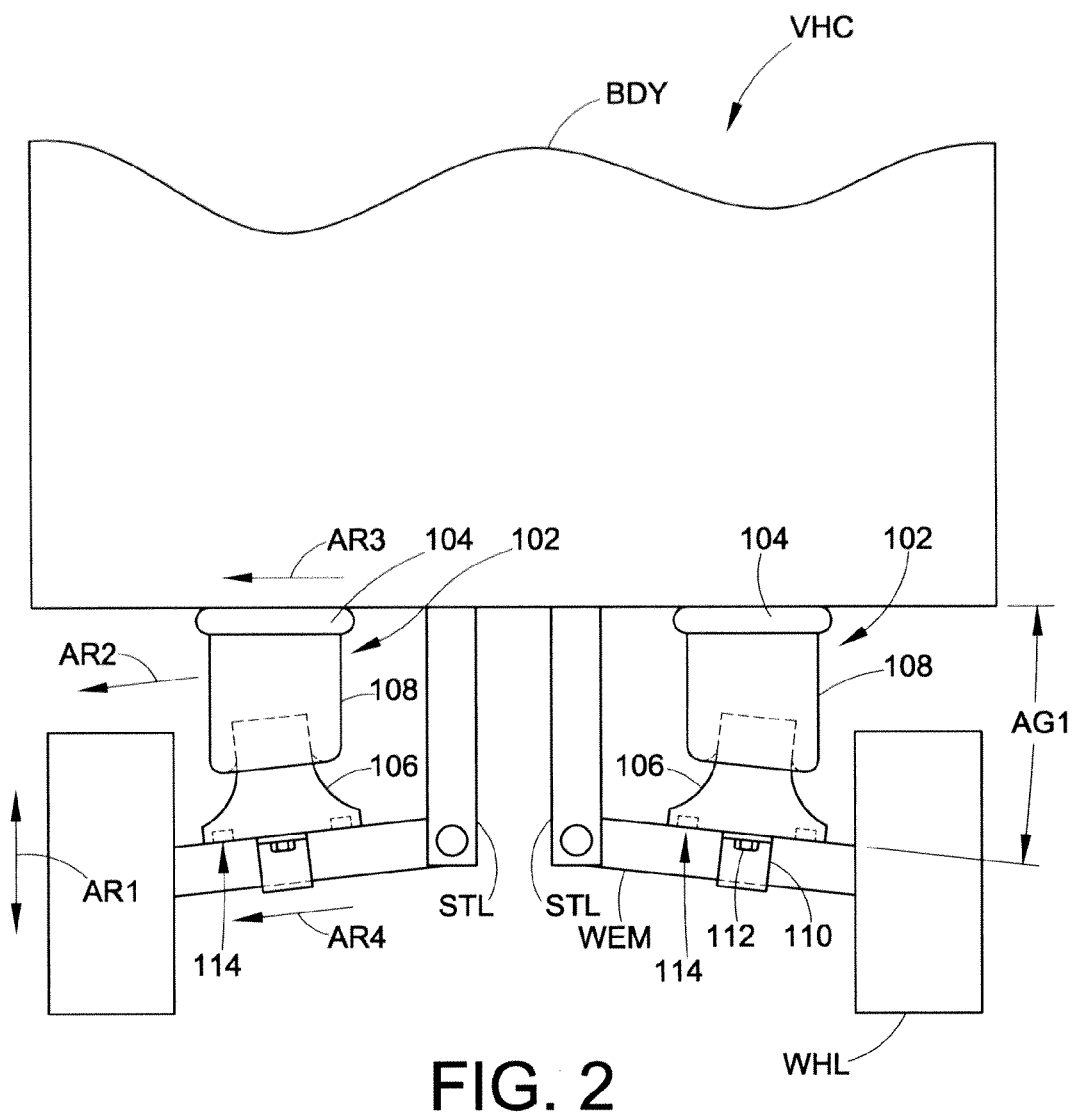
FIG. 2 is a side view of the vehicle in FIG. 1 taken from along line 2-2 thereof.

Furthermore, it will be appreciated that the gas spring assemblies can be operatively connected between the sprung and unsprung masses of an associated vehicle in any suitable manner. For example, gas spring assemblies 102 are shown in FIG. 2 as being operatively connected between wheel-engaging members WEM and body BDY of associated vehicle VHC. It will be appreciated, however, that the configuration of vehicle VHC in FIG. 2 is merely a schematic representation of the structural components of the sprung and unsprung masses of the vehicle. Thus, it will be understood that this schematic representation is provided for purposes of discussion and ease of understanding and is not intended to be in any way limiting.

With further reference to the exemplary arrangement in FIG. 2, wheel-engaging members WEM are shown as being pivotally attached to structural components STL such that the wheel-engaging members move through an angle AG1 relative to body BDY as wheels WHL undergo vertical movements (e.g., jounce and rebound actions), which movements are represented in FIG. 2 by arrow AR1. Thus, it will be recognized that as wheels WHL move vertically away from body BDY (i.e., under a rebound condition), angle AG1 between the body and the corresponding wheel-engaging member will increase and gas spring assembly 102, which is operatively connected therebetween, will become elongated. It will also be recognized that as wheels WHL move vertically toward body BDY (i.e., under a jounce condition), angle AG1 will decrease and gas spring assembly 102 will become compressed. Due, at least in part, to the body and wheel-engaging member acting on the gas spring assembly at an angle to one another, gas spring assembly 102 will normally be pinched, squeezed or otherwise biased toward the open end of angle AG1, as is represented by arrow AR2. This biasing action results in the generation of forces that act laterally on the opposing end members of the gas spring assembly (e.g., bead plate 104 and piston 106), as is indicated by arrows AR3 and AR4, respectively, in FIG. 2. Thus, the biasing action acts to urge the end members of the gas spring assembly in a laterally-outward direction, such as toward wheels WHL, for example.

It is common practice for gas spring assemblies to be secured to the associated sprung and unsprung masses in a manner suitable for withstanding longitudinally (i.e., axially) acting forces or loads. Additionally, it will be appreciated that securement components and/or features of a wide variety of types, kinds, configurations and/or constructions have been used to secure the end members of the gas spring assemblies to the vehicle components in the longitudinal (i.e., axial) direction. In many such known mounting arrangements, one or more fasteners or other securement elements will pass through an opening in the structural component on which the end member is supported to engage the end member and thereby secure the gas spring assembly to the structural component.

Figure 3:
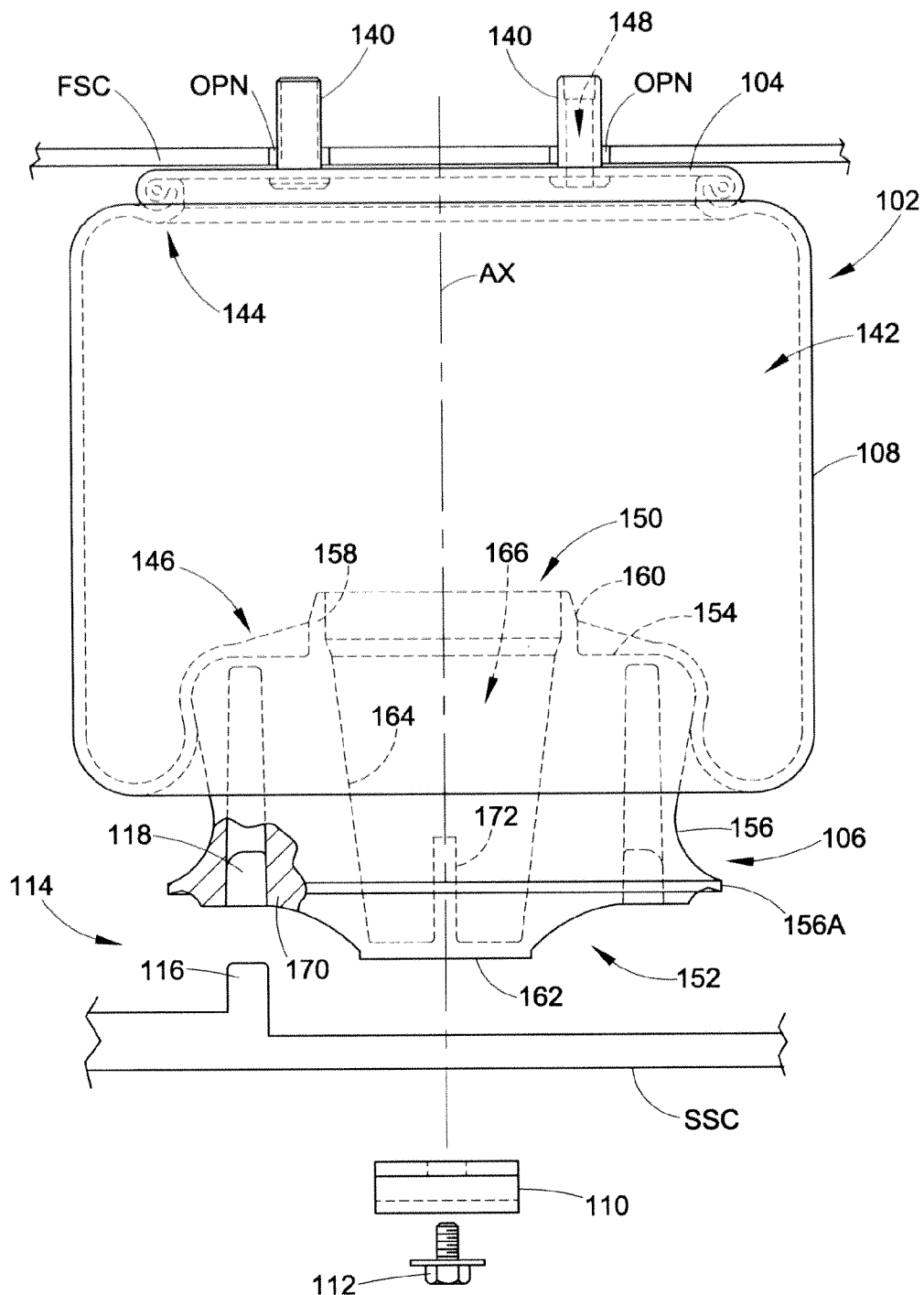
FIG. 3 is an enlarged portion of the side view in FIG. 2 showing in greater detail a gas spring assembly including an exemplary mounting arrangement for cooperative use with an associated vehicle structure.
Figure 4:
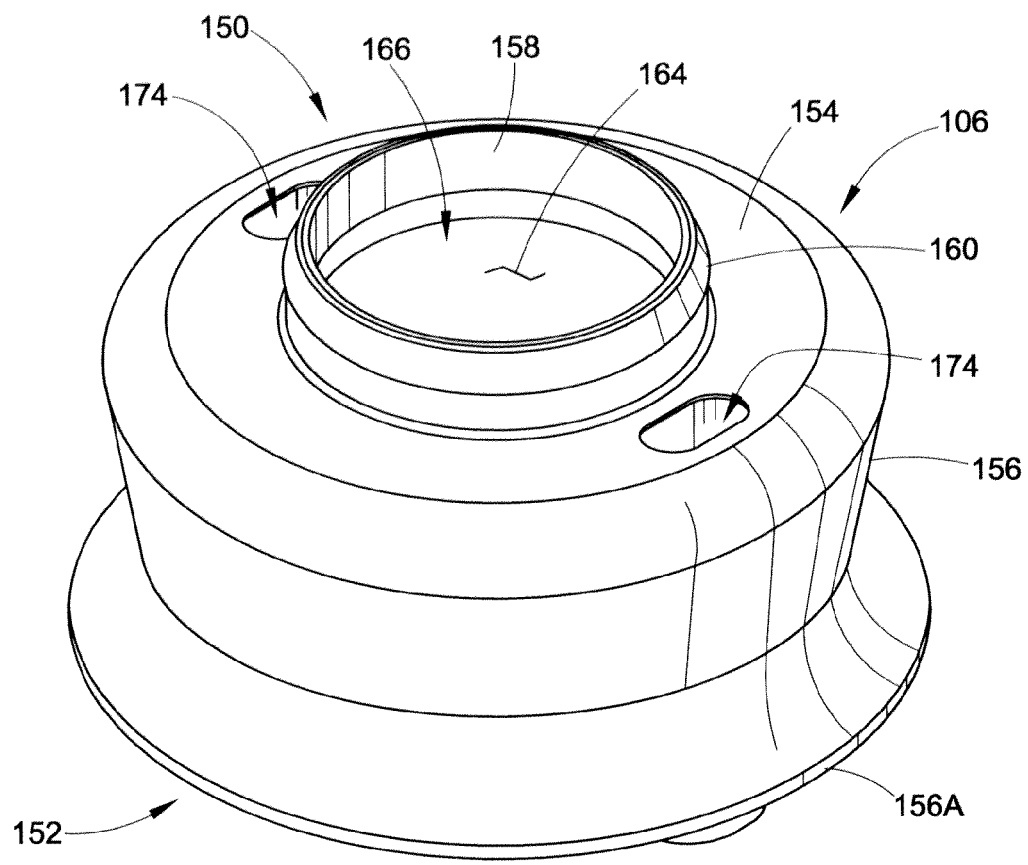
FIG. 4 is top perspective view of an exemplary end member of the gas spring assembly in FIG. 3.
Figure 5:
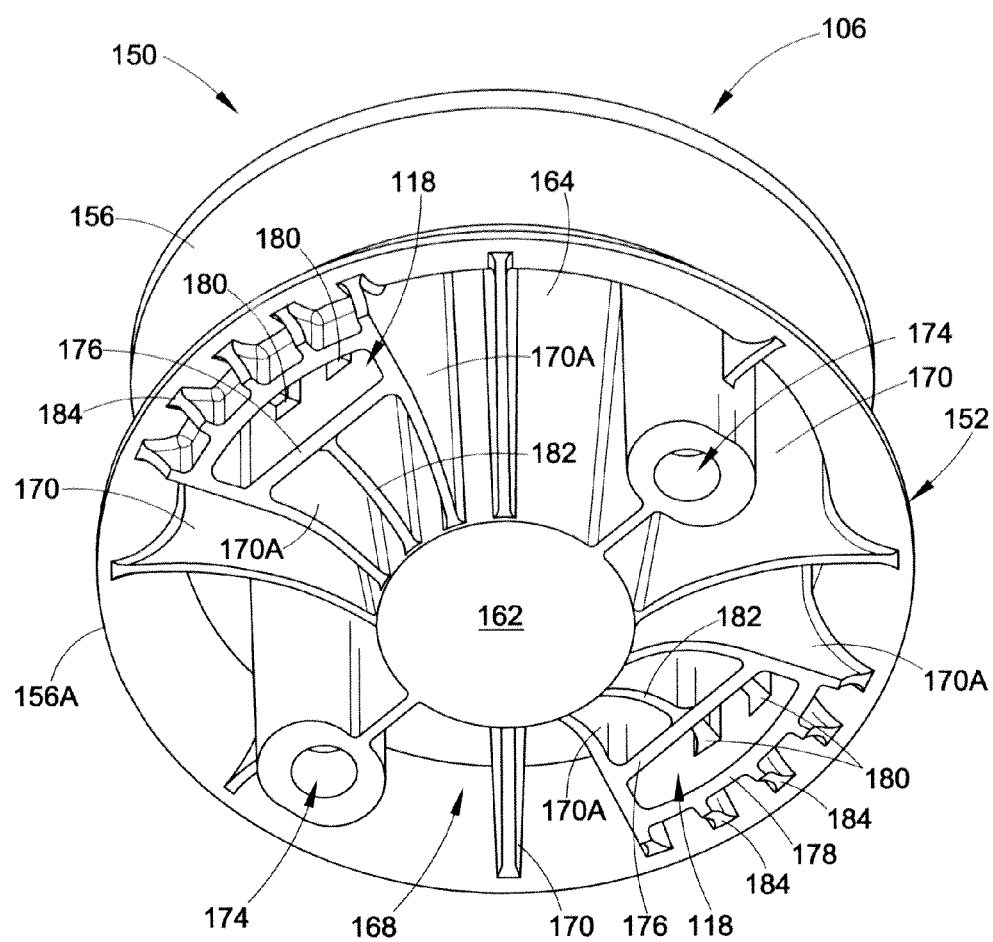
FIG. 5 is a bottom perspective view of the exemplary end member in FIG. 4.
Figure 6:
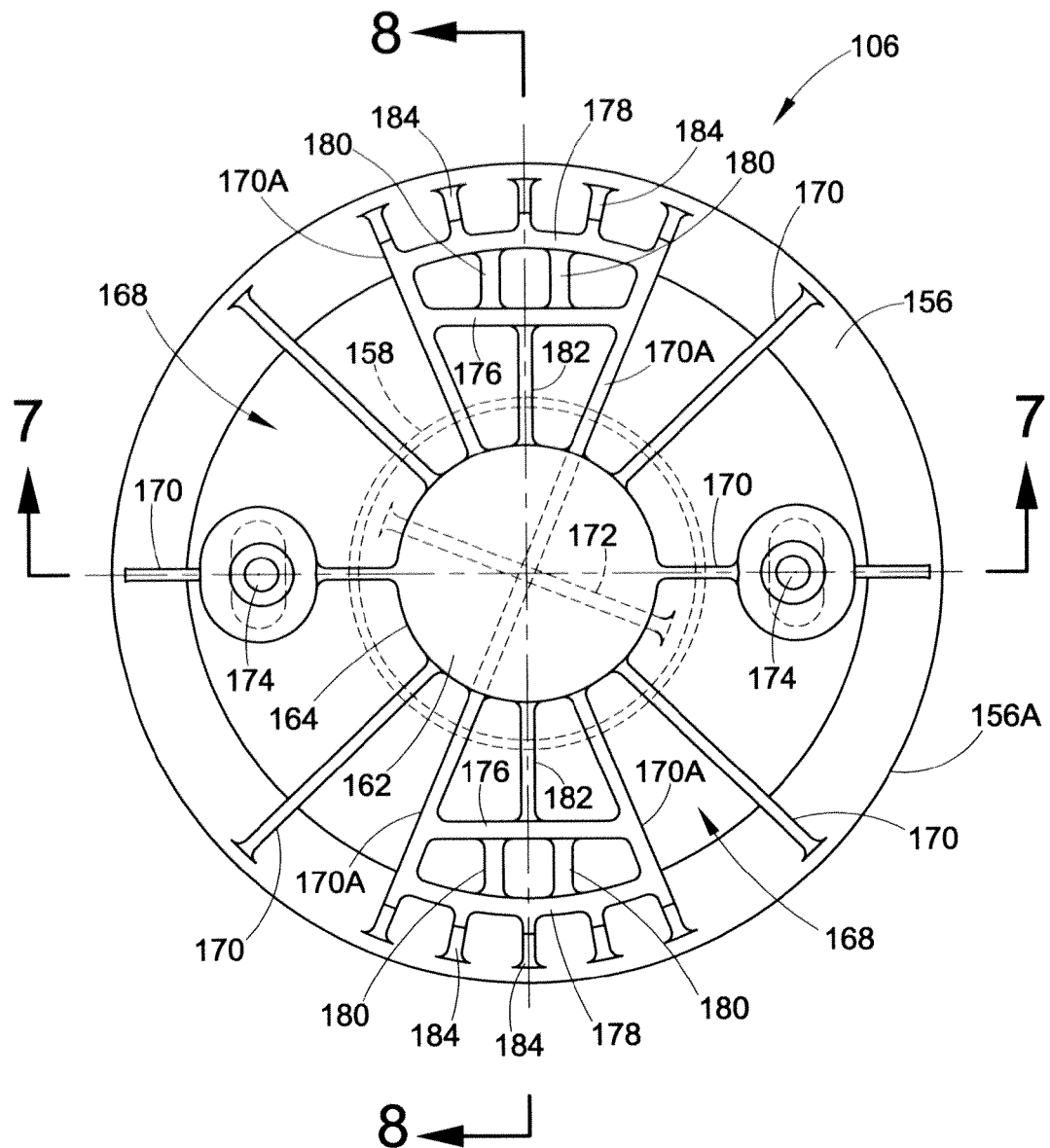
FIG. 6 is a bottom plan view of the exemplary end member in FIGS. 4 and 5.
Figure 7:
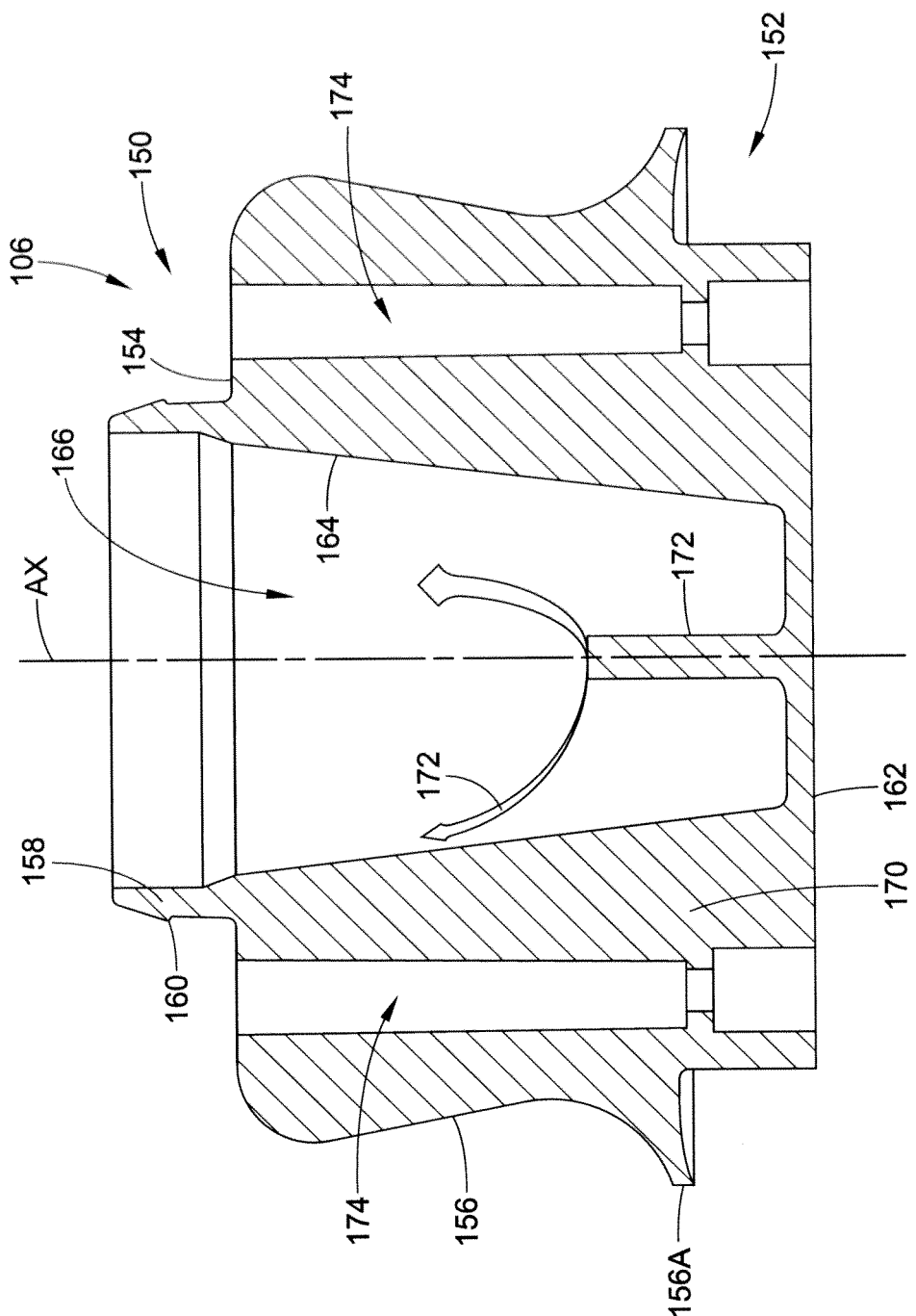
FIG. 7 is a cross-sectional side view of the exemplary end member in FIGS. 4-6 taken from along line 7-7 in FIG. 6.
Figure 8:
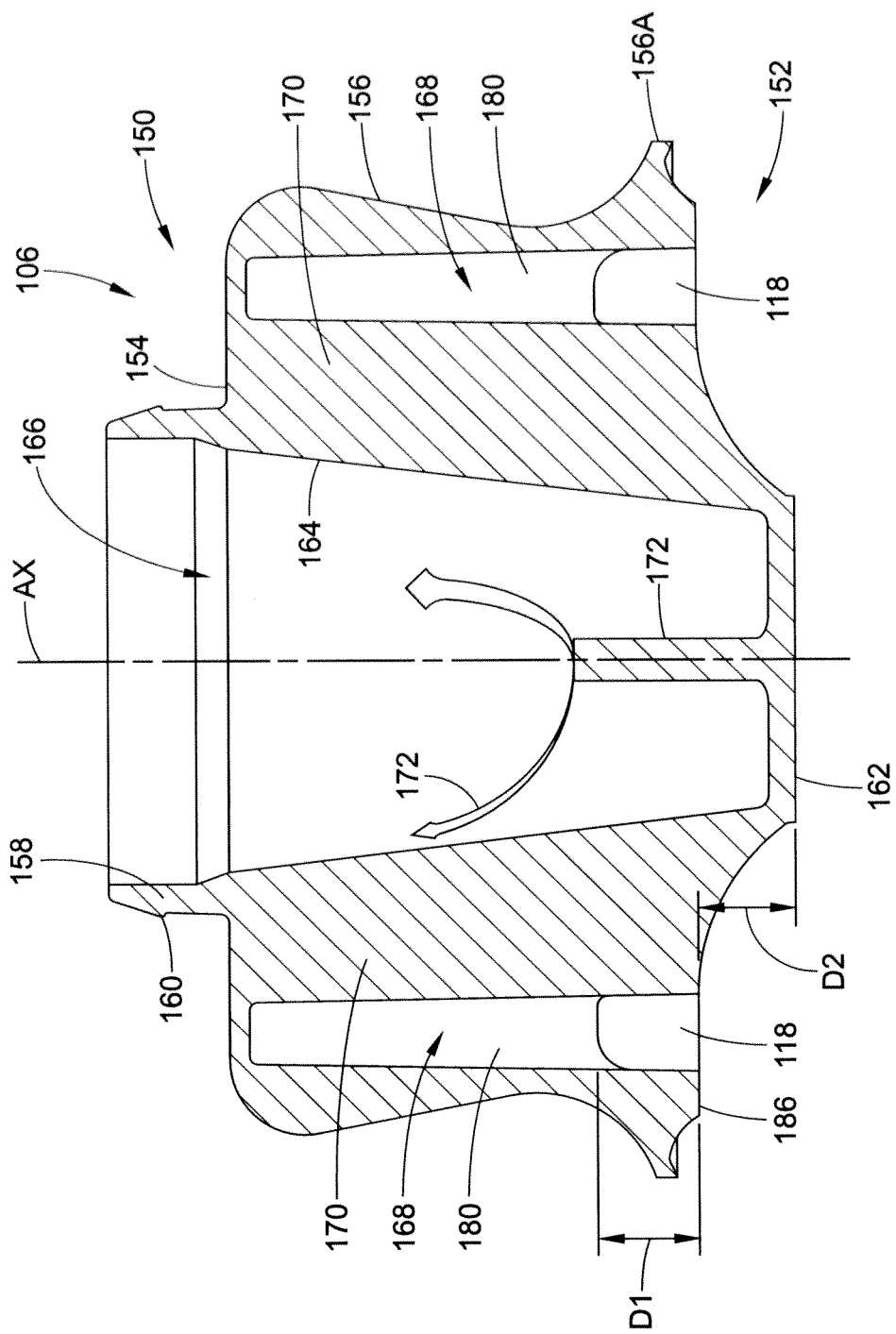
FIG. 8 is a cross-sectional side view of the exemplary end member in FIGS. 4-7 taken from along line 8-8 in FIG. 6.

In other situations, however, it is desirable to secure the gas spring assembly to the structural component without the use of fasteners or other securement elements that extend through (i.e., pass through an opening in) the structural component. Such external mounting or clamping arrangements may be employed for any one or more of a variety of reasons, such as space constraints and/or strength-related issues, for example. While it will be appreciated that any suitable external mounting or clamping arrangement may be used, one example of such an arrangement is shown and described in U.S. Pat. No. 6,945,548, which illustrates an air spring bracket (702) in FIG. 19 thereof and which is described therein at least column 14 from about lines 23-47, the disclosure of which is hereby incorporated herein by reference. A similar arrangement is shown in FIGS. 2 and 3 of the present disclosure that includes an exemplary bracket 110 extending around three sides of wheel-engaging member WEM with piston 106 being secured thereto by way of fasteners 112 (only one of which is shown) that interconnect bracket 110 and piston 104 to thereby secure the gas spring assembly on or along the structural component (e.g., wheel-engaging member WEM).

In accordance with one aspect of the subject disclosure, a cooperative mounting arrangement is provided in which an end member of a gas spring assembly and a corresponding vehicle component associated therewith interengage one another. In this way, the aforementioned laterally-acting forces associated with the pinching action can be transferred from the end member to the corresponding structural component without undesirably effecting the gas spring assembly. And, it will be appreciated that a cooperative mounting arrangement in accordance with the subject matter of the present disclosure may find particular application and use in connection with external mounting or clamping arrangements that extend along the exterior of the wheel-engaging member (or other vehicle component) and are secured thereto without the use of elements (e.g., a fastener or other securement device) that extend through the wheel-engaging member (or other vehicle component).

It will be appreciated that any suitable configuration can be used to secure the opposing end members of the gas spring assembly to the vehicle components and thereby accommodate any laterally-extending forces urging the end members toward the open end of angle AG1, as discussed above. As one example, a cooperative mounting arrangement 114 can include a projection 116 (FIG. 3) extending from wheel-engaging member WEM and a recess or pocket 118 (FIG. 3) formed into an and member, such as piston 106, for example, of the gas spring assembly or another component operatively associated therewith, such as a spacer, for example. Such a cooperative mounting arrangement permits the end member of the gas spring assembly and the wheel-engaging member (or other vehicle component) to interengage one another and thereby maintain the position of the end member relative to the wheel-engaging member (or other vehicle component) under any laterally acting forces, such as may be generated by the above-discussed compressing or pinching action of the vehicle components, for example.

Suspension system 100 can also optionally include a pressurized gas supply system 120 that is operatively associated with the gas spring assemblies for selectively supplying pressurized gas (e.g., air) thereto and selectively transferring pressurized gas therefrom. In the exemplary embodiment shown in FIG. 1, gas supply system 120 includes a pressurized gas source, such as a compressor 122, for example, for generating pressurized air or other gases. The gas supply system can also include any number of one or more control devices of any suitable type, kind and/or construction that may be capable of affecting the selective transfer of pressurized gas. For example, a valve assembly 124 is shown as being in communication with compressor 122 and can be of any suitable configuration or arrangement. In the exemplary embodiment shown, valve assembly 124 includes a valve block 126 with a plurality of valves 128 supported thereon. Valve assembly 124 can also optionally include a suitable exhaust, such as a muffler 130, for example, for venting pressurized gas from the system. Optionally, pressurized gas supply system 120 can also include a reservoir 132 in fluid communication with valve assembly 124 and suitable for storing pressurized gas.

The one or more control devices, such as valve assembly 124, for example, can be in communication with gas spring assemblies 102 in any suitable manner, such as, for example, through suitable fluid transmission lines 134. As such, pressurized gas can be selectively transmitted to and/or from the gas springs through valve assembly 124, such as to alter or maintain vehicle height at one or more corners of the vehicle, for example.

Suspension system 100 also includes a control system 136 that is capable of communication with any one or more other systems and/or components (not shown) of suspension system 100 and/or of which VHC and is capable of selective operation and control of the suspension system. Control system 136 includes a controller or electronic control unit (ECU) 138 in communication with compressor 122 and/or valve assembly 124, such as through a suitable conductor or lead (not shown), for example, for selective operation and control thereof, including supplying and exhausting pressurized fluid to and from gas spring assemblies 102. Additionally, it will be appreciated that controller 138 can be of any suitable type, kind and/or configuration.

Control system 136 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Turning now to FIG. 3, gas spring assembly 102 includes a central axis AX that extends longitudinally between the first end member (e.g., bead plate 104), which is disposed toward one end of axis AX, and the opposing second end member (e.g., piston 106), which is spaced from the first end member toward another end of axis AX. The first end member is disposed along a first or upper structural component FSC, such as a vehicle body or chassis, for example, and can be adapted for securement thereto in any suitable manner. For example, first structural component FSC is shown in FIG. 3 as including holes or openings OPN that are suitable for securement of the first end member to the first structural component. Gas spring assembly 102 is shown as including mounting studs 140 that project axially-outwardly from bead plate 104 and extend through openings OPN in the first structural component. Suitable fastening elements, such as threaded nuts (not shown), for example, can be used to secure bead plate 104 to first structural component FSC. It will be recognized that such a mounting arrangement will generally be sufficient to oppose any lateral loads or forces acting on the first end member (e.g., bead plate 104), such as the lateral forces represented by arrow AR3 in FIG. 2, for example.

The second end member is disposed along a second or lower structural component SSC, such as an axle or other wheel-engaging member, for example, and is adapted for securement on or along this second structural component. In one preferred arrangement, the second end member is adapted for securement to the second structural component by way of an external mounting bracket or other component or arrangement that does not rely upon the use of fasteners extending through the second structural component. One example of such an external mounting arrangement is shown in FIGS. 2 and 3 as bracket 110 and fasteners 112. However, it will be appreciated that any other suitable arrangement could alternately be used.

Additionally, at least one of the end members of a gas spring assembly and a corresponding one of the structural components associated therewith include a cooperative mounting arrangement (e.g., cooperative mounting arrangement 114) suitable for accommodating laterally-acting forces, such as have been previously describe, for example. In one preferred arrangement, such a cooperative mounting arrangement will be used in cases in which an external mounting bracket or other arrangement is employed that does not rely upon the use of fasteners that extend through openings in the associated structural component, such as the external mounting arrangement in FIGS. 2 and 3 using bracket 110 and fasteners 112, for example. It will be appreciated that the use of such a cooperative mounting arrangement can act to oppose any such laterally-acting forces, which may not be sufficiently accommodated by an external mounting arrangement acting alone.

As mentioned above, the opposing end members (e.g., bead plate 104 and piston 106) can be secured to the flexible wall (e.g., flexible sleeve 108) in any manner suitable for forming a substantially fluid-tight seal therewith such that a spring chamber 142 is at least partially defined therebetween. As one example, the flexible wall (e.g., flexible sleeve 108) is shown and described herein as being of an elongated sleeve-type configuration that is capable of forming a rolling lobe along the exterior of an end member (e.g., piston 104) of the gas spring assembly. However, it is to be understood that the subject matter of the present disclosure is capable of broad use in association with any suitable type, kind, and/or configuration of gas spring assembly.

Also, the flexible wall (e.g., flexible sleeve 108) can be secured between the first and second end members in any suitable manner. As shown in FIGS. 2 and 3, for example, flexible sleeve 108 extends between opposing ends 144 and 146. End 144 is shown as being an open end that is connected along bead plate 104 using a crimped arrangement to form a substantially fluid tight seal between the bead plate and the end of the flexible sleeve. End 146 of the flexible sleeve is received on a portion of piston 106 and is secured thereon by way of a snap-fit connection. Pressurized gas can be communicated into and out of spring chamber 142 in any suitable manner, such as, for example, through a passage 148 extending through one of mounting studs 140.

With reference, now, to FIGS. 3-8, piston 106 extends axially between opposing first and second ends, which are generally represented by reference numbers 150 and 152, respectively. First end 150 includes a first end wall 154 that is adapted to abuttingly engage flexible sleeve 108 and an outer side wall 156 that extends from along end wall 154 toward second end 152 of the piston. Outer side wall 156 is shown as having a curvilinear shape or configuration. However, it will be appreciated that any suitable size, shape and/or configuration could alternately be used, such as a frustoconical or a cylindrical shape, for example. In any case, outer side wall 156 will include a radially-outermost side wall portion that at least partially defines the outermost radial extent of the piston. In the exemplary embodiment shown in FIGS. 3-8, this radially-outmost side wall portion is identified by reference number 156A and will have an overall dimension (not shown) representing the maximum diameter or width of the radially-outermost side wall portion. An axially-extending annular wall 158 projects from along end wall 154 generally opposite the direction of outer side wall 156 and can be dimensioned to cooperatively receive an open end (e.g., second end 146) of the flexible wall associated therewith. A radially outwardly-extending projection or lip 160 is shown as being disposed along annular wall 158 and can operate to at least partially maintain second end 146 on annular wall 158. It will be appreciated, however, that any suitable configuration and/or arrangement can alternately be used for securement of the flexible wall on or along the piston and, thus, that annular wall 158 and lip 160 are optional.

Piston 106 also includes a second end wall 162 that is disposed along second end 152 and adapted to cooperatively engage second structural component SSC. In the exemplary case shown, second end wall 162 is approximately planar and adapted to abuttingly engage second structural component SSC. Piston 106 further includes an inner side wall 164 that at least partially defines an inner cavity 166. In the exemplary arrangement shown, inner side wall 164 extends in an approximately longitudinal direction and generally between first and second end walls 154 and 162. Inner side wall 164 is disposed in radially inwardly-spaced relation to outer side wall 156 such that an outer cavity 168 is formed therebetween. A plurality of outwardly-extending support walls 170 extend between the inner and outer side walls and thereby structurally interconnect the same. Additionally, a plurality of inner support walls 172 can optionally be included within inner cavity 166, such as, for example, along second end wall 162 and extending generally between different portions of inner side wall 164. Support walls 170 can be of any suitable quantity, configuration and/or arrangement and can extend along any portion of the longitudinal length of piston 106. In one exemplary case, outer support walls 170 extend radially-outwardly from inner side wall 164 and along approximately the entire longitudinal length of outer side wall 156 such that outer cavity 168 is separated into a plurality of individual chambers (not numbered). However, it will be understood that any other number, arrangement and/or configuration of inner support walls 172 and/or outer support walls 170 can alternately be used.

Piston 106 also includes at least one securement feature suitable for at least partially securing the piston on or along the corresponding structural component. In the exemplary arrangement shown, piston 106 includes a plurality of passages 174 that extend through the piston and are suitable for receiving at least a portion of a fastener, such as fastener 112, for example. Mating fastener components, such as threaded nuts (not shown), for example, could be received within a portion of passages 174 or, alternately, mating threads (not shown) could be provided within the passage, either directly in the piston material or in the form of threaded inserts (not shown) embedded within the piston. It will be appreciated, however, that any other suitable arrangement could alternately be used, such as the use of mounting studs (not shown) projecting from the piston, for example.

As discussed above, piston 106 includes at least one mounting feature adapted to cooperatively engage a corresponding mounting feature on an associated structural component such that the interengagement of the cooperative mounting features can act to withstand, overcome or otherwise accommodate laterally-acting loads or forces that may be applied to the piston. As is further illustrated in FIGS. 5 and 6, piston 106 includes a recess 118 dimensioned to cooperatively receive a corresponding projection 116 (FIG. 3) formed, installed or otherwise provided on or along second structural component SSC with the recess and projection together forming cooperative mounting arrangement 114. Additionally, any number of one or more recesses, such as recesses 118, for example, can be used. As illustrated in the accompanying drawing figures, two recess disposed circumferentially opposite one another about 180 degrees apart) are provided on piston 106 and permit the same to be mounted in either of two rotational orientations. However, it is to be understood that any number of one or more cooperative mounting arrangements or portions thereof can be used (e.g., one projection with two or more cooperative recesses).

Recesses 118 can be provided on piston 106 in any suitable manner and using any suitable configuration and/or arrangement of structural elements and features to at least partially define the recess. In the exemplary arrangement shown, recess 118 is positioned in between outer and inner side walls 156 and 164 such that forces and/or loads transferred to piston 106 by way of the recess are not directly applied to either of the inner or outer side walls, which is a preferred arrangement. Thus, in such a preferred arrangement, projection 116 will not directly abuttingly engage either of the inner side wall or the outer side wall. Rather, recess 118 can be established by one or more recess walls extending between adjacent ones of the outer support walls, which are identified in FIGS. 5 and 6 by reference numbers 170A. It will be appreciated that the one or more recess walls that at least partially define the one or more recesses of the end member can be of any suitable size, shape, construction, configuration and/or arrangement. In the exemplary arrangement shown, the recesses are at least partially defined by inner and outer recess walls 176 and 178, respectively, with the inner recess wall being approximately straight and the outer recess wall being somewhat curved.

A piston in accordance with the subject matter of the present disclosure (e.g., piston 106) can optionally include one or more support walls or ribs extending between two of the recess walls and/or between one of the recess walls and another wall of the piston. It will be appreciated that such optional support ribs can act to buttress the recess walls and, thus, can result in a more robust recess that may be capable of increased performance (e.g., load carrying capacity). In the present exemplary arrangement, piston 106 includes a plurality of recess support ribs 180 extending between inner and outer recess walls 176 and 178. Additionally, piston 106 is shown as including an inner support rib 182 extending between inner recess wall 176 and inner side wall 164. Piston 106 is also shown as including a plurality of outer support ribs 184 extending between outer recess wall 178 and outer side wall 156. It is to be understood, however, that the arrangement of support ribs shown and described herein is merely exemplary and that any other number, arrangement, configuration and/or construction of support ribs can alternately be used.

The embodiment in FIGS. 2-8 includes an arrangement in which a component (e.g., piston 106) of a gas spring assembly is supported directly on an associated structural component (e.g., second structural component SSC). It will be recognized, however, that in some cases it may be desirable for a gas spring assembly to be supported in spaced relation to an associated structural component. In such cases, a spacer may be used that is secured between an end member of the gas spring assembly and the associated structural component. One example of a known spacer is shown and described in U.S. Pat. No. 6,945,548, as has been discussed above.

Turning now to FIGS. 9-12, an alternate embodiment of a piston 200 suitable for use in forming a gas spring assembly, such as gas spring assembly 102, for example, is illustrated that includes a first end 202 and an opposing second end 204. The first and second ends are longitudinally spaced from one another such that a central axis AX extends therebetween. First end 202 includes a first end wall 206 that is adapted to abuttingly engage an associated flexible wall or sleeve of a gas spring assembly (e.g., flexible sleeve 108). An axially-extending annular wall 208 can optionally project from along end wall 206 in a direction generally opposite second end 204 and can be dimensioned to cooperatively receive an open end (e.g., second end 146) of the flexible wall associated therewith. A radially outwardly-extending projection or lip 210 can optionally be included and can operate to at least partially maintain the open end of the flexible wall in abutting engagement with second end 202 of piston 200. It will be appreciate, however, that any other suitable arrangement and/or configuration could alternately be used for securing the flexible wall on or along piston 200.

Piston 200 also includes a second end wall 212 that is disposed along second end 204 and is adapted to cooperatively engage an associated structural component (e.g., second structural component SSC in FIG. 3). In the exemplary arrangement shown in FIGS. 9-12, second end wall 212 is approximately planar and is adapted to abuttingly engage an associated structural component for securement therealong. Piston 200 further includes an inner side wall 214 that extends circumferentially about axis AX and at least partially defines an inner cavity or chamber 216. In the exemplary arrangement shown, inner side wall 214 extends in an approximately longitudinal direction and is generally disposed between first and second end walls 206 and 212. A plurality of inner support walls (not shown) can optionally extend between different portions of inner side wall 214 and across inner cavity 216, such as has been discussed above with regard to inner support walls 172, for example.

Piston 200 also includes an outer side wall 218 that extends in a generally longitudinal direction from along first end 202 toward second end 204 and is spaced radially-outwardly from inner side wall 214 such that an outer cavity 220 is formed therebetween. Outer side wall 218 includes a first side wall portion 222 that extends from along first end 202, such as from adjacent first end wall 206 thereof, for example, at a first axial distance or length LT1. Along this first length, first side wall portion 222 is fully circumferential and can extend substantially continuously about piston 200. As such, an associated flexible wall that is axially displaced along first side wall portion 222 will be fully supported along the entire length thereof.

Outer side wall 218 also includes at least one second side wall portion 224 that extends from along first side wall portion 222 to a second axial distance or length LT2. In addition to varying in length, the one or more second side wall portions differ from the first side wall portion in that one or more second side wall portions 224 are not fully circumferential. That is, the at least one second side wall portion extends only partially about the circumference of piston 200, such as along a circumferential section of first side wall portion 222, for example. As a result, outer side wall 218 has a bottom or distal edge 226 that has a non-planar profile that varies along the circumference of the piston. That is, all circumferential portions of distal edge 226 (at a given diameter of outer side wall 218) do not fall within a common plane. While it will be appreciated that such a non-planar profile of distal edge 226 can take any suitable form and/or configuration, in one exemplary embodiment the portions of distal edge 226 established by first side wall portion 222 will fall within a first plane (not shown) and at least some portion of distal edge 226 established by at least one second side wall portion 224 will fall within a second plane (not shown) that is parallel with the first plane (not shown).

As discussed above, a rolling lobe sleeve will, under certain conditions of operation and/or use, be displace beyond the distal edge of an outer side wall of the associated piston of a gas spring assembly. The provision of at least one second side wall portion 224 acts to extend the outer side wall beyond the area that is normally available to support the flexible sleeve of the gas spring assembly. In this way, such roll-off conditions can be minimized or eliminated, particularly in situations in which a gap or space is formed between the piston and the associated structural component, as discussed above.

It will be recognized, however, that because the second side wall portion or portions do not extend around the full circumference of the piston, at least some portion of the flexible sleeve may remain unsupported and, thus, even partially roll-off a section of the distal edge of the piston. As such, in one exemplary embodiment, smooth transitions and gently curving surfaces are provide at, along and between the one or more portions of distal edge 226 of outer side wall 218. Such smooth transitions and gently curving surfaces can minimize undesirable influences (e.g., stress concentrations) that may act on a flexible wall during contact therewith. Such a situation may occur where the rolling lobe of a flexible sleeve is longitudinally displaced from along first side wall portion 222 onto and off of one or more second side wall portions 224, such as has been discussed above, for example.

As such, at least one second side wall portion 224 is shown in FIGS. 9-12 as including optional transition sections 224A that extend from opposing ends of the second side wall portion or portions. Transition sections 224A, if provided, can act to interconnect the distal extent of the second side wall portion or portions with the distal extent of the first side wall portion. In this manner, distal edge 226 of outer side wall 218 can extend in a substantially continuous manner about the outer side wall. In one preferred embodiment, transition sections 224A can include one or more curvilinear edge portions and can be approximately tangentially interconnected with the distal extents of first and second side wall portions 222 and 224. As a result, distal edge 226 of outer side wall 218 can form a single contoured surface.

Figure 9:
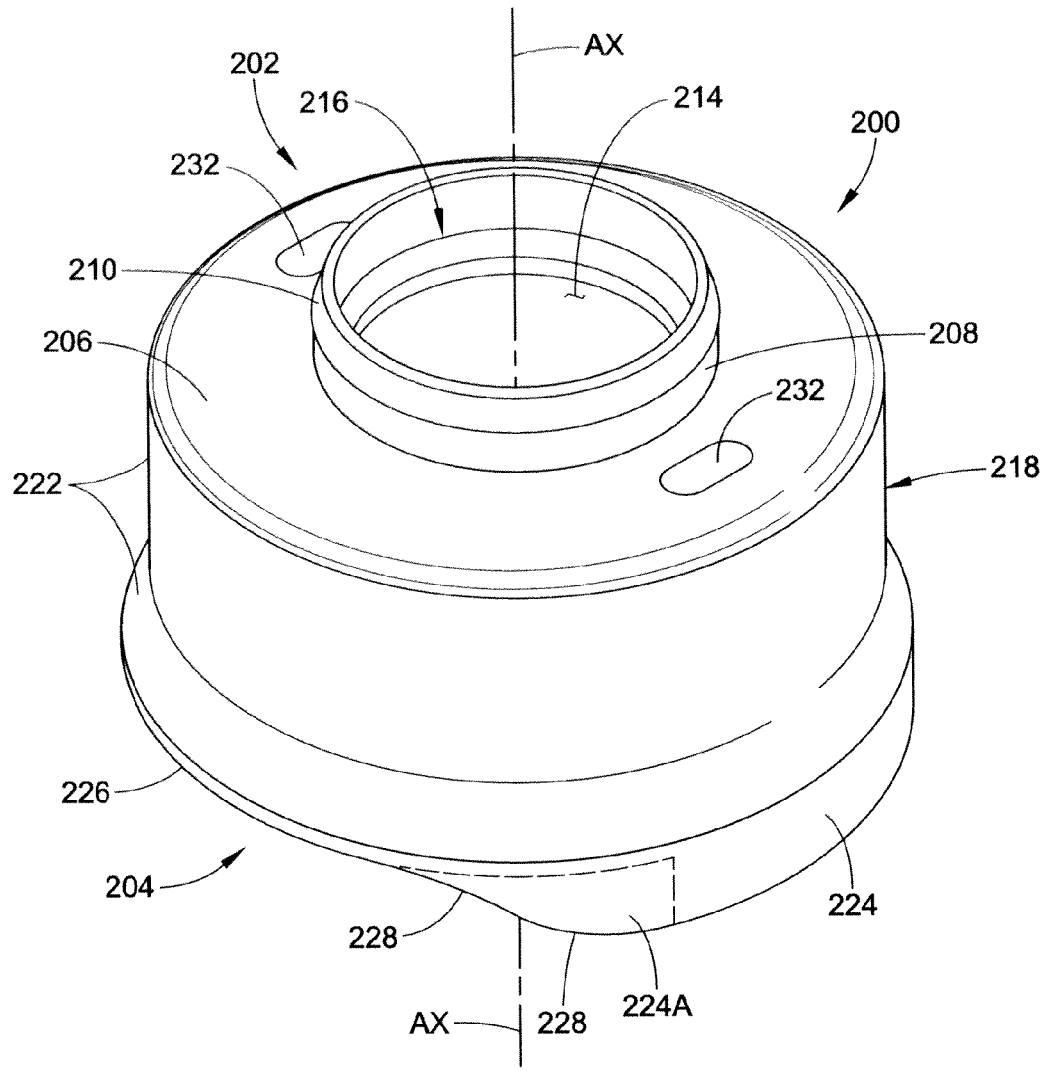
FIG. 9 is a top perspective view of another exemplary end member of the gas spring assembly in FIG. 3.
Figure 10:
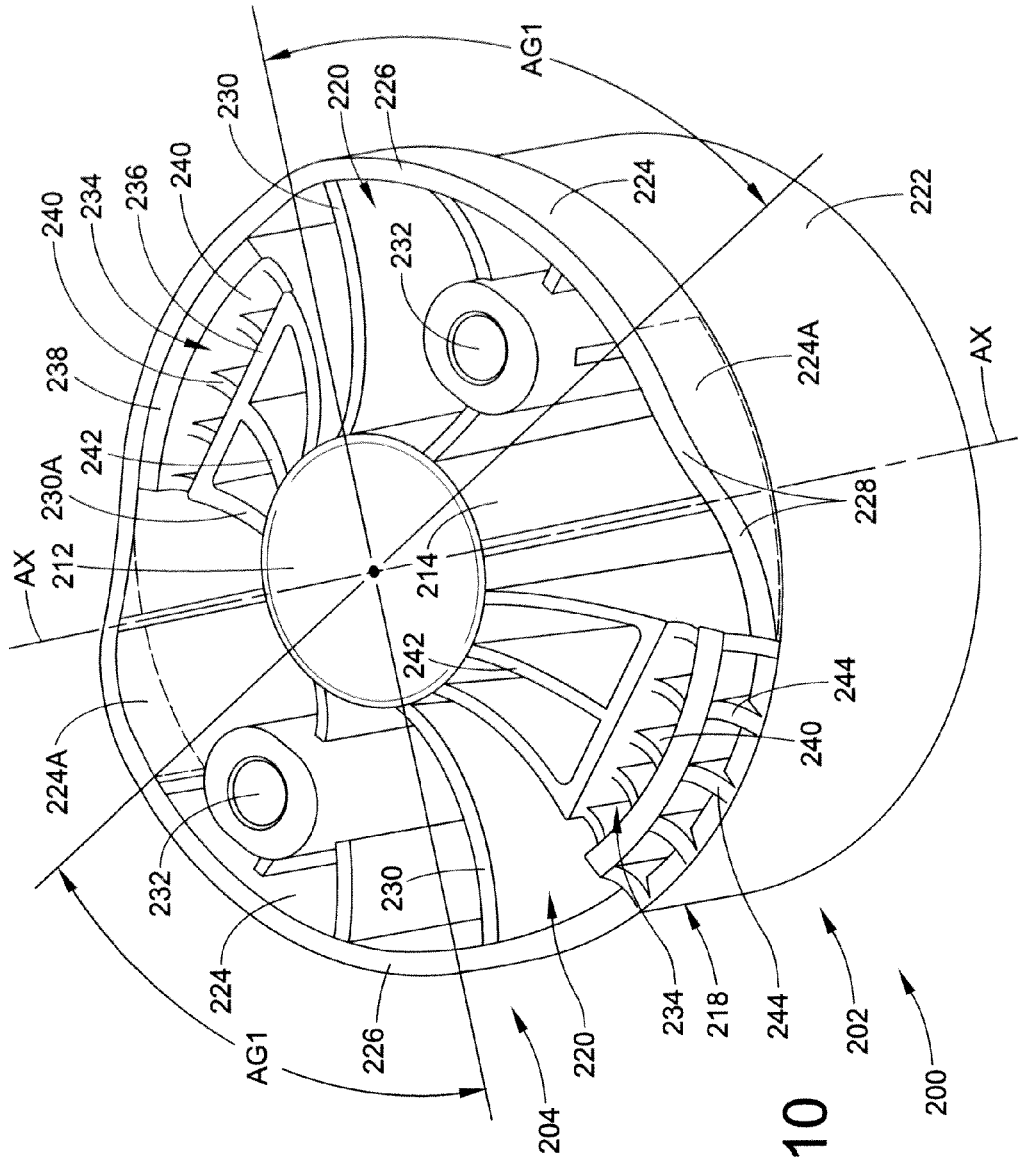
FIG. 10 is a bottom perspective view of the exemplary end member in FIG. 9.

It will be appreciated that any number of one or more second side wall portions 224 can be provided on or along piston 200, and that the one or more second side wall portions can be configured and/or arranged in any suitable manner and/or orientation. For example, two second side wall portions 224 are included in forming side wall 218 of piston 200 in the exemplary arrangement shown in FIGS. 9-12. These two second side wall portions are disposed circumferentially opposite one another (i.e., approximately 180 degrees apart) with each second side wall portion extending circumferentially through an angle AG1, as shown in FIG. 10.

Additionally, it will be appreciated that the one or more second side wall portions can extend any suitable distance along the circumference of the piston, and such distance can be inclusive or exclusive of any optional transition sections (e.g., transition sections 224A) that may be included. For example, second side wall portions 224 can extend through an angle AG1 within a range of from approximately 10 degrees to approximately 170 degrees, and within a preferred range of from approximately 45 degrees to approximately 135 degrees, and within a more preferred range of from approximately 60 degrees to approximately 120 degrees. Furthermore, different ones of any two or more second side wall portions, if provided, can optionally extend through different circumferential lengths and/or angles, rather than being substantially identical as illustrated in FIGS. 9-12 with respect to second side wall portions 224.

Figure 11:
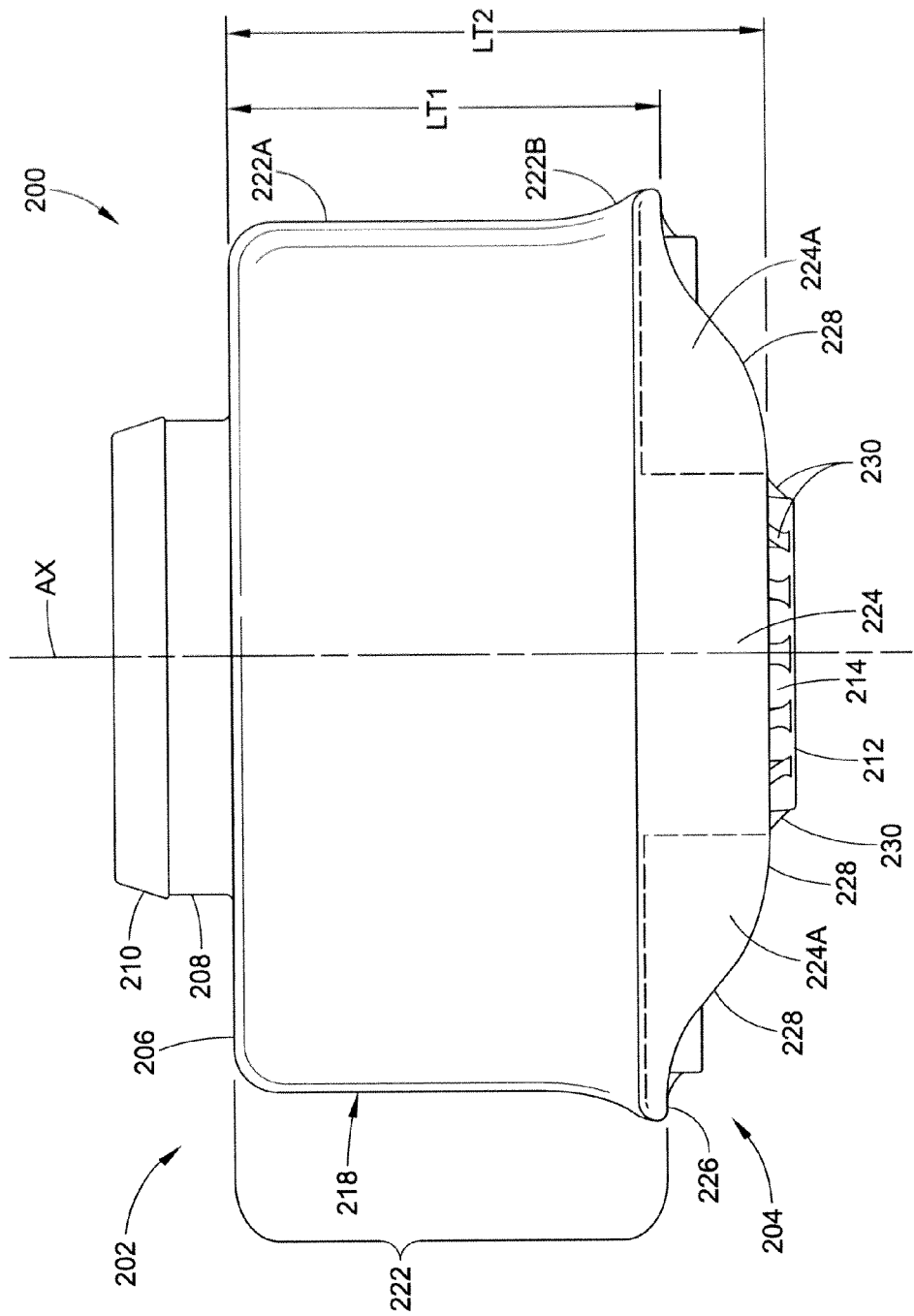
FIG. 11 is a side view of the exemplary end member in FIGS. 9 and 10 taken from along line 11-11 in FIG. 9.
Figure 12:
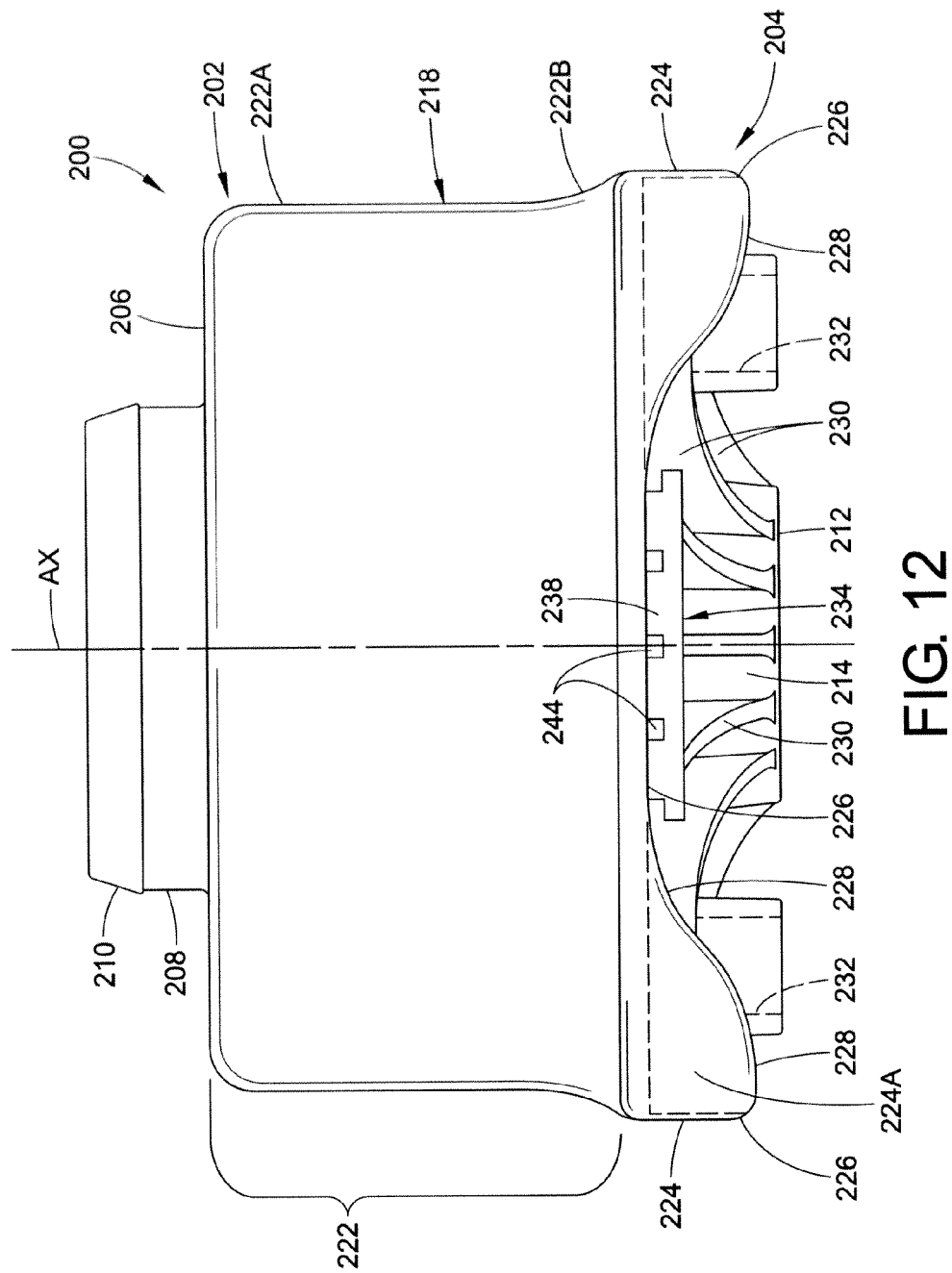
FIG. 12 is a side view of the exemplary end member in FIGS. 9-11 taken from along line 12-12 in FIG. 11.

Furthermore, it will be appreciated that outer side wall 218 and/or any portion or portions thereof, can have any suitable size, shape, profile and/or configuration. For example, the outer side wall and/or any portion or portions thereof can include sections that are curvilinear, frustoconical, cylindrical or any combination thereof in shape or profile. As shown in FIGS. 9-12, first side wall portion 222 includes a substantially cylindrical upper section 222A and a curvilinear lower section 222B, as indicated in FIG. 11. Additionally, second side wall portions 224 are shown as being substantially cylindrical. However, any other arrangement and/or configuration could alternately be used.

Piston 200 also includes a plurality of outwardly-extending support walls 230 that extend between inner and outer side walls 214 and 218 and thereby structurally interconnect the same. It will be appreciated that outer support walls 230 can be of any suitable quantity, configuration and/or arrangement, and can extend along any portion of the longitudinal length of piston 200. In one exemplary case, outer support walls 230 extend radially-outwardly from inner side wall 214 and along approximately the entire longitudinal length of at least first side wall portion 222 of outer side wall 218 such that outer cavity 220 is separated into a plurality of individual chambers (not numbered). However, it will be understood that any other number, arrangement and/or configuration of inner and/or outer support walls could alternately be used.

Piston 200 also includes at least one securement feature suitable for at least partially securing the piston on or along a corresponding structural component. In the exemplary arrangement shown, piston 200 includes a plurality of passages 232 that extend through the piston and are suitable for receiving at least a portion of a fastener or other securement element for suitably affixing piston 200 on or along an associated structural component. It will be appreciated, however, that any other suitable arrangement and/or configuration could alternately be used, such as one or more mounting studs (not shown) or threaded inserts (not shown), for example.

Piston 200 can also optionally include at least one mounting feature adapted to cooperatively engage a corresponding mounting feature on an associated structural component such that the inter-engagement of the cooperative mounting features can act to withstand, overcome or otherwise accommodate laterally-acting loads or forces that may be applied to the piston, such as has been discussed above with regard to the inter-engagement of projection 116 and recess 118 in FIG. 3, for example. That is, piston 200 can optionally include a recess 234 that is dimensioned to cooperatively receive an associated projection (e.g., projection 116 in FIG. 3) formed, installed or otherwise provided on or along an associated structural component with the recess and projection together forming a cooperative mounting arrangement, such as has been discussed above with regard to arrangement 114, for example.

It will be appreciated that any number of one or more recesses, such as recesses 234, for example, can be provided on piston 200. As illustrated in FIG. 9, two recesses 234 are disposed circumferentially opposite one another (i.e., about 180 degrees apart). Such a configuration permits piston 200 to be positioned in either of two rotational orientations about axis AX, with circumferentially-opposing second side wall portions 224 disposed on each side of the associated structural component in either mounting position. Nonetheless, it is to be understood that any number of one or more cooperative mounting arrangements or portions thereof can be used (e.g., one projection with two or more cooperative recesses).

Additionally, any such one or more recesses, if included, can be provided on piston 200 in any suitable manner and using any suitable configuration and/or arrangement of structural elements and features to at least partially define the recess or recesses. In the exemplary arrangement shown, recesses 234 are positioned between inner and outer side walls 214 and 218, respectively, such that forces and/or loads transferred to piston 200 by way of a recess are not directly applied to either of the inner or outer side walls, which is a preferred arrangement. Thus, in such a preferred arrangement, an associated projection (e.g., projection 116 in FIG. 3) will not directly abuttingly engage either of the inner side wall or the outer side wall of the piston. Rather, the one or more recesses can be established or otherwise defined through the inclusion of one or more recess walls that extend between adjacent ones of the outer support walls, which are identified in FIG. 10 by reference number 230A. It will be appreciated that the one or more recess walls that at least partially define the one or more optional recesses of the piston can be of any suitable size, shape, construction, configuration and/or arrangement. In the exemplary arrangement shown, the recesses are at least partially defined by inner and outer recess walls 236 and 238, respectively. In the exemplary embodiment shown, inner recess wall 236 extends in an approximately straight configuration and outer recess wall 238 is somewhat curved.

Additionally, piston 200 can optionally include one or more support walls or ribs extending between two of the recess walls and/or between one of the recess walls and another wall of the piston. It will be appreciated that such optional support ribs can act to buttress the recess walls and, thus, can result in a more robust recess that may be capable of increased performance (e.g., load carrying capacity). In the present exemplary arrangement, piston 200 optionally includes a plurality of recess support ribs 240 extending between inner and outer recess walls 236 and 238. Additionally, piston 200 is shown as including an optional inner support rib 242 extending between inner recess wall 236 and inner side wall 214. Piston 200 is also shown as optionally including a plurality of outer support ribs 244 extending between outer recess wall 238 and outer side wall 218. It is to be understood, however, that the arrangement of support ribs shown and described herein is merely exemplary and that any other arrangement, configuration and/or construction of support ribs could alternately be used.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid, such as nitrogen, could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly comprising:
   a flexible sleeve including a sleeve wall extending between longitudinally-spaced sleeve ends and having a longitudinal axis extending therebetween, said sleeve wall extending circumferentially about said axis to at least partially define a spring chamber;
   an end member secured along one of said ends of said flexible sleeve such that a substantially fluid-tight seal is formed with said sleeve wall; and,
      a piston secured on the other of said ends of said flexible sleeve such that a substantially fluid-tight seal is formed with said sleeve wall, said piston including a first end wall abuttingly engaging said sleeve wall and an outer side wall extending transverse to said first end wall and suitable for rolling a lobe of said sleeve wall therealong, said outer side wall including:
   a first side wall portion at least partially defining a fully circumferential support area for abuttingly engaging said flexible sleeve;
   a second side wall portion extending longitudinally from said first side wall portion in a direction away from said first end wall, said second side wall portion defining a first partially circumferential support area that extends around less than the full circumference of said piston; and,
   a third side wall portion extending longitudinally from said first side wall portion in a direction away from said first end wall, said third side wall portion disposed in circumferentially spaced relation to said second side wall portion and defining a third partially circumferential support area that extends around less than the full circumference of said piston;
   said first and second partially circumferential support areas being dimensioned to abuttingly engage corresponding circumferential portions of said flexible sleeve upon longitudinal displacement of said lobe of said sleeve wall beyond said fully circumferential support area.

2. A gas spring assembly according to claim 1, wherein said first end wall is approximately planar.

3. A gas spring assembly according to claim 1, wherein said outer side wall includes a distal edge disposed opposite said first end wall, and said distal edge being at least partially defined by a distal extent of said first side wall portion and said a distal extent of said second side wall portion such that said distal edge has a non-planar profile.

4. A gas spring assembly according to claim 3, wherein said third side wall portion has a distal extent disposed said second longitudinal distance from said first end wall, said distal edge of said outer side wall is at least partially defined by said distal extent of said first side wall portion, said distal extent of said second side wall portion and said distal extent of said third side wall portion with said distal extents of said second and third side wall portions and said distal extent of said first side wall portion being interconnected such that said distal edge of said outer side wall extends substantially continuously about said outer side wall.

5. A gas spring assembly according to claim 1, wherein said piston includes an inner side wall disposed in radially-inwardly spaced relation to said outer side wall such that an outer chamber is at least partially defined therebetween.

6. A gas spring assembly according to claim 5, wherein said piston includes first and second support walls extending from said inner side wall to said outer side wall such that said inner and outer side walls are interconnected thereby, said first and second support walls being disposed in spaced relation to one another such that said outer chamber is at least partially divided by said first and second support walls.

7. A gas spring assembly according to claim 5, wherein said piston extends longitudinally between opposing first and second ends, and said inner side wall at least partially defines an inner chamber having an open end disposed toward one of said first and second ends of said piston.

8. A gas spring assembly according to claim 1, wherein said outer side wall includes a distal edge disposed in spaced relation to said first end wall, and said piston includes a second end wall disposed opposite said first end wall along said second end, said second end wall being substantially planar and adapted to abuttingly engage an associated structural component such that said distal edge of said outer side wall is supported in spaced relation to the associated structural component.

9. A gas spring assembly according to claim 8, wherein said piston includes at least one securement feature accessible from along said second end and operative to at least partially secure said piston along the associated structural component.

10. A gas spring assembly according to claim 9 further comprising an external mounting bracket adapted to cooperatively align with said at least one securement feature for securing said piston on the associated structural component.

11. A piston for use in forming an associated gas spring assembly including an associated flexible sleeve, said piston comprising:

a first end including a first end wall adapted to abuttingly engage the associated flexible sleeve of the associated gas spring assembly;

an opposing second end including a second end wall adapted to abuttingly engage an associated structural component, said second end disposed in longitudinally-spaced relation to said first end such that a central axis extends therebetween; and, an outer side wall extending longitudinally along said piston and being suitable for rolling of an associated lobe of the associated flexible sleeve therealong, said outer side wall including:

a first side wall portion at least partially defining a fully circumferential support area for abuttingly engaging said flexible sleeve, said first side wall portion having a distal extent disposed at a first longitudinal distance from said first end wall;

a plurality of second side wall portions extending longitudinally from said first side wall portion in a direction away from said first end wall, said plurality of second side wall portions disposed in circumferentially spaced relation to one another and having a distal extent disposed at a second longitudinal distance from said first end wall, said second longitudinal distance being greater than said first longitudinal distance such that said plurality of second side wall portions extend longitudinally beyond said distal extent of said first side wall portion, and each of said plurality of second side wall portions defining a partially circumferential support area that extends around less than the full circumference of said piston, said plurality of second side wall portions being dimensioned to abuttingly engage a corresponding circumferential portion of the associated flexible sleeve upon longitudinal displacement of the associated lobe of the associated sleeve wall beyond said fully circumferential support area.

12. A piston according to claim 11, wherein said distal extent of said first side wall portion and said distal extent of said at least one second side wall portion together at least partially define a distal edge of said outer side wall with said distal edge having a non-planar profile.

13. A piston according to claim 11, wherein said distal extents of said plurality of second side wall portions and said distal extent of said first side wall portion are interconnected to at least partially define a distal edge that extends substantially continuously about said outer side wall.

14. A piston according to claim 13, wherein said plurality of second side wall portions each include first and second transition sections which are each curvilinear and approximately tangentially interconnect with said distal extents of said first and second side wall portions such that said distal edge of said outer side wall forms a single contoured surface.

15. A piston according to claim 11 further comprising an inner side wall extending longitudinally along said piston, said inner side wall disposed in radially-inwardly spaced relation to said outer side wall such that an outer chamber is at least partially defined therebetween.

16. A piston according to claim 15 further comprising a plurality of support walls extending between said inner and outer side walls thereby interconnecting said inner and outer support walls to one another, said plurality of support walls disposed in spaced relation to one another such said outer chamber is at least partially separated into a plurality of chamber portions.

17. A piston according to claim 11, wherein said outer side wall includes one or more of a substantially cylindrical wall section, a curvilinear wall section and a frustoconical wall section extending longitudinally therealong.

18. A gas spring assembly according to claim 1, wherein said second side wall portion extends circumferentially through an included angle having a value within a range of from approximately 10 degrees to approximately 170 degrees, and said third side wall portion extends circumferentially through an included angle having a value within a range of from approximately 10 degrees to approximately 170 degrees.

19. A piston according to claim 11, wherein said plurality of second side wall portions extend circumferentially through an included angle having a value within a range of from approximately 10 degrees to approximately 170 degrees.

20. A gas spring assembly comprising:

a flexible sleeve including a sleeve wall extending between longitudinally-spaced sleeve ends and having a longitudinal axis extending therebetween, said sleeve wall extending circumferentially about said axis to at least partially define a spring chamber;

a first end member secured along one of said ends of said flexible sleeve such that a substantially fluid-tight seal is formed with said sleeve wall; and, a second end member secured on the other of said ends of said flexible sleeve such that a substantially fluid-tight seal is formed with said sleeve wall, said second end member including:

a first end wall abuttingly engaging said sleeve wall;

a first side wall portion extending transverse to said first end wall and suitable for rolling a lobe of said sleeve wall therealong, said first side wall portion at least partially defining a fully circumferential support area for abuttingly engaging said flexible sleeve, said first side wall portion having at least one distal extent disposed at a first longitudinal distance from said first end wall; and, a plurality of second side wall portions extending longitudinally from said first side wall portion in a direction away from said first end wall, said plurality of second side wall portions extend longitudinally beyond said distal extent of said first side wall portion, said plurality of second side wall portions disposed in circumferentially spaced relation to one another such that each of said plurality of second side wall portions defines a partially circumferential support area that extends around less than the full circumference of said second end member, said plurality of second side wall portions being dimensioned to abuttingly engage a corresponding circumferential portion of said flexible sleeve upon longitudinal displacement of said lobe of said flexible sleeve wall beyond said fully circumferential support area.

* * * * *

UNITED STATES PATENT AND TRADEMARK OFFICE
CERTIFICATE OF CORRECTION

| | | |
|---|---|---|
| PATENT NO. | : 8,739,683 B2 | Page 1 of 1 |
| APPLICATION NO. | : 13/466534 | |
| DATED | : June 3, 2014 | |
| INVENTOR(S) | : Egolf et al. | |

It is certified that error appears in the above-identified patent and that said Letters Patent is hereby corrected as shown below:

IN THE CLAIMS

In column 18, line 19, claim 3, delete the first instance of the word "said".

Signed and Sealed this
Twelfth Day of January, 2016

Michelle K. Lee
*Director of the United States Patent and Trademark Office*